United States Patent [19]

Guzy et al.

[11] 3,926,900

[45] Dec. 16, 1975

[54] OIL-RESISTANT BLENDS FOR ELECTRICAL INSULATION

[75] Inventors: Raymond L. Guzy, Morton Grove; Rajesh N. Sheth, Chicago, both of Ill.

[73] Assignee: Borg-Warner Corporation, Chicago, Ill.

[22] Filed: Dec. 13, 1973

[21] Appl. No.: 424,262

[52] U.S. Cl. .......................... 260/33.6 AQ; 260/894
[51] Int. Cl.$^2$ ........................................... C08K 5/01
[58] Field of Search ......... 260/33.6 AQ, 897 A, 894

[56] References Cited
UNITED STATES PATENTS

| | | | |
|---|---|---|---|
| 2,912,410 | 11/1959 | Cole | 260/688 |
| 2,924,559 | 2/1960 | Safford et al. | 264/22 |
| 3,343,582 | 9/1967 | Hines et al. | 260/897 |
| 3,438,933 | 4/1969 | Bartsch | 273/218 |
| 3,451,962 | 6/1969 | Auler et al. | 260/889 |
| 3,478,132 | 11/1969 | Randolph | 273/278 |
| 3,564,079 | 2/1971 | Soldatos | 260/889 |
| 3,630,974 | 12/1971 | Ladocsi et al. | 260/5 |
| 3,649,573 | 3/1972 | Yasui et al. | 260/5 |
| 3,741,931 | 6/1973 | Martin et al. | 260/42.33 |
| 3,769,370 | 10/1973 | Martin et al. | 260/889 |

FOREIGN PATENTS OR APPLICATIONS 962,519  7/1964  United Kingdom ........ 260/33.6 AQ

OTHER PUBLICATIONS

Def. Pub., published 12/24/68, (657,493).
Encyclopedia of Pol. Sci. & Techn., Vol. 10, page 228 (Interscience) (N.Y.) (1969).
Martin–Rubber Chem. Techn., 47, 275–285, (1974), (effective date under 35 USC 102 (a) is 10/6/72).

*Primary Examiner*—M. J. Welsh
*Assistant Examiner*—H. H. Fletcher
*Attorney, Agent, or Firm*—Richard J. Schlott

[57] ABSTRACT

Blends comprising ethylene-propylene terpolymers, an extending or compounding oil and a liquid 1,2-polybutadiene, when peroxide cured, are surprisingly oil resistant at elevated temperatures and pressures. Such blends are useful as electrical insulating materials for use under extreme environmental conditions, particularly in wire and cable constructions.

2 Claims, No Drawings

OIL-RESISTANT BLENDS FOR ELECTRICAL INSULATION

BACKGROUND OF THE INVENTION

This invention relates to electric insulating materials for use at elevated temperatures under extreme pressures and exposure to oil and water environments; and more particularly to polyblends or polybutadiene with ethylene-propylene copolymers having markedly improved resistance to extreme environmental conditions.

Synthetic olefin polymers have found increasing application as thermoplastic insulating materials in various electrical applications. In particular, ethylene-propylene copolymer rubbers, known as EPR, and ethylene-propylene-diene monomer terpolymers, known as EPDM, have been widely employed as primary insulating materials for electric wire and cable largely because of their ease of compounding, good extrudability and excellent electrical characteristics. These materials have the characteristics of flowing and/or distorting at elevated temperatures and under extreme pressures and are sensitive to swelling and dissolving in various hydrocarbon solvents and oils, which has limited their application to moderate environmental conditions. Where insulated wire and cable is needed for extreme conditions, either alternate and more difficultly-processable insulating materials are employed, or the insulation must be protected by added layers of secondary insulating and barrier materials, with a consequent increase is manufacturing difficulties and costs. Accordingly, a material exhibiting the excellent electrical characteristics, ease of compounding and ready processability of EPR and EPDM insulating materials and having the ability to withstand extremes of temperature and pressures and exposure to solvents, oil and aqueous environments would markedly advance the electrical insulation art. Such a material could find wide application as an inexpensive wire insulation for service at elevated temperatures, and would be especially desirable for use in wire and cable constructions designed for exposures where resistance to oils and solvents at elevated temperatures is a prerequisite. Among the applications envisioned is the construction of wire and cable for use in deep hot oil wells, where exposure to pressures above 2,000 psi and temperatures in excess of 250°F. in contact with crude oil, brines and hot gases is commonly encountered.

SUMMARY OF THE INVENTION

It has now been found that oil-extended EPDM insulating materials in blends containing 20 to 40% by weight of liquid 1,2 polymerized butadiene, when suitably compounded and cured, are excellent primary insulating materials, and are relatively unaffected by temperature, pressure and exposure to oils and brines. The materials of this invention exhibit only minor dimensional changes when exposed to oil, water and brine at pressures up to 4,000 psi and temperatures above 300°F., while retaining their excellent electrical insulating characteristics.

DETAILED DESCRIPTION

The EPDM materials employed in the practice of this invention are terpolymers of ethylene with propylene and minor amounts of a non-conjugated diene monomer and are widely available commercial materials. In general, the ethylene monomer component normally ranges from 20 to 80% by weight and the propylene concentration from 80 to 20% by weight. A non-conjugated diene monomer is additionally employed in EPDM, the amount used normally being sufficient to provide curing sites, but not so great as to interfere seriously with the rubbery character of the product, i.e., in the range of 2 to about 20% by weight and preferably not greater than 10% by weight of the total product. Typically, the diene monomer is a straight chain or cyclic diolefin such as 1,4-hexadiene, dicyclopentadiene ethylidene norbornene and the like. The preferred EPDM materials are those containing from about 50% to about 80% ethylene and correspondingly from about 45 to about 15% propylene, the remaining portion being diene monomer.

To be suitable for the purposes of this invention, the EPDM employed must be oil-extended, that is compounded with one of a number of the common extending and compounding hydrocarbon oils. Among the extending oils suitable for this purpose are napthenic oils. The oil extension, accomplished by normal compounding techniques including Banburying and roll milling, is essential to the practice of this invention, and the proportion of EPDM to oil employed will be in the ratio of from 2:3 to about 3:1, selection of the exact proportion depending in part upon the EPDM employed. It has been found that when lesser amounts of oil are employed, the resulting compounded materials are quite rigid and difficult to process, and hence are unsuited for use as wire and cable insulation. Such materials will, however, withstand exposure to the extreme environmental conditions of high temperature and pressure exposure to oil and brine, and may well be useful in other applications where flexibility is not as important.

The liquid 1,2-polybutadiene is characterized as a low molecular weight polymer of butadiene wherein greater than 50% of the monomer units are present in the 1,2 configuration. As is well known, 1,3-butadiene monomer may be polymerized by a variety of techniques to give polymers having a high proportion of units having 1,4 attachment in the cis and trans configuration. Certain commercial techniques based on anionic polymerization technology are also well known whereby the 1,3-butadiene monomer may be polymerized to give polymers having a high proportion of 1,2 attachment, viz:

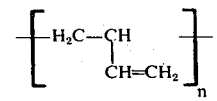

Such polymers can be produced in a variety of molecular weight ranges and with varying proportions of 1,2 to 1,4 units. For the purposes of this invention, only those materials having molecular weights low enough to be liquid or semi-solid, when at room temperature and solvent-free, and containing not less than 50 mole percent units having a 1,2 attachment, preferably not less than 80% mole percent units having 1,2 attachment, the remaining fraction being units with 1,4 attachment, are useful. While the molecular weight of these materials may vary somewhat depending on proportion of 1,2 and 1,4 attachments and remain liquid, it has been found that the most desirable have molecular weight in the range of 1500 to 25,000. Although called liquid resin, many of these are extremely viscous, having viscosities in excess of 10,000 cps at room temperature, becoming truly pourable only when heated.

It is essential that the level of liquid polybutadiene employed for the blend be greater than about 20% by weight of the final blend of EPDM, oil and polybutadiene to obtain adequate resistance to swell by oil and by water under conditions of extreme temperature and pressure. While somewhat lesser amounts may be employed where exposure to extreme conditions is not contemplated, blends containing as little as 10% by weight polybutadiene are considered to be too sensitive to hot oil, water and similar environments to be useful. The flexibility of the resulting blend is greatly affected by increased levels of polybutadiene, and while increased levels of oil in the blend may offset this effect in part, it has been found that blends containing greater than about 40% by weight of the liquid polybutadiene are too rigid, hard and inflexible when cured to be useful as wire and cable insulating materials. Therefore, the preferred range of liquid polybutadiene in the final blend of EPDM, oil and liquid polybutadiene is in the range of from 20 to about 40% by weight liquid polybutadiene based on the total blend, and more preferably in the range of 20 to about 30% by weight liquid polybutadiene. For use as a primary insulation in oil well wire and cable construction, the most preferable composition appears to be a blend containing from about 25 to about 29% by weight of the liquid polybutadiene, again based upon the total weight of EPDM, oil and polybutadiene in the blend.

A suitable curing agent must also be provided to effect the necessary curing and crosslinking of the compounded material. While sulfur-based curing systems have been employed for EPDM and for polybutadienes, we have found such systems less desirable for our purposes then the organo-peroxide curing agents. More particularly, the higher temperature peroxides such as dicumyl peroxide and $\alpha,\alpha'$-bis(t-butylperoxy)-di-isopropyl benzene are best suited for this practice of the invention in that the resulting cure is rapidly accomplished and complete. The amount of curing agent employed will normally be in the range of 1 to 8%, preferably about 2 to 6% by weight of the total composition. Inasmuch as the degree of cure and crosslinking markedly affects solvent and environmental resistance of the final compound, very low levels of curing agent are undesirable, while levels greater than indicated result in high levels of cure and consequently a more rigid inflexible material undesirable for use as wire and cable insulation.

The blending of the EPDM resin, the oil and the liquid diene resin may be accomplished by any of the common rubber compounding methods including roll-milling and the like. Additional materials including the curing agent, lubricants, fillers antioxidants and carbon blacks commonly employed in electrical insulating resins may also be added, either at this point or during a later compounding step. It is desirable to include a cure co-agent to effect rapid cure and more complete utilization of the peroxide. Among the co-agents which may be useful for this purpose are trimethylolpropane trimethacrylate and m-phenylene dimaleimide. Curing co-agent compounds are normally employed in amounts of from 1 to 5%, and preferably from 1 to 3% by weight of the total composition.

THE EXAMPLES

The invention may be more fully understood by reference to the following examples, wherein all parts are shown by weight.

In order to demonstrate the excellent environmental resistance of the materials of this invention, compositions were formulated by compounding on a two roll mill, cured in slab form having about 0.070 inch thickness by heating at 400°F. for 10 min. in a press, cut into 1-½ inch × ¾ inch strips and tested. The environmental test consisted of placing the sample to be treated into a pressure vessel containing the selected fluid, pressurizing the vessel with nitrogen and heating while maintaining the pressure at 4,000 psi. After 7 days, at the testing temperature, the vessel was cooled to room temperature, the pressure was released, and the sample removed. The final weight and dimensions of each were measured and the % change was recorded.

The two test fluids normally employed are a white mineral oil and tap water. The various formulations and the results of the environmental testing are recorded in Table I.

Table I.

| Ingredients(1) | 1 | 2 | 3 | 4 | 5 | 6 | 7 | 8 | 9 |
|---|---|---|---|---|---|---|---|---|---|
| EPDM(2) | 90 | 80 | 67 | 65(4) | 60 | 65 | 60 | 60 | 40 |
| Oil(3) | 90 | 80 | 67 | — | 25 | 65 | 60 | 60 | 40 |
| Liquid Polybutadiene | 10 | 20 | 33 | 35 | 40 | 35 | 40 | 40 | 60 |
| % Liquid Polybutadiene | 5.3% | 11.1% | 20% | 35% | 32% | 21.2% | 25% | 25% | 43% |
| Zinc Oxide | 5 | 5 | 8.3 | 5 | 5 | 5 | 5 | 5 | 5 |
| Stearic Acid | 1 | 1 | 1.6 | 1 | 1 | 1 | 1 | 1 | 1 |
| Dihydroquinoline | 1 | 1 | 1.6 | 1 | 1 | 1 | 1 | 1 | 1 |
| Titanium Dioxide | — | 10 | 16.6 | — | 10 | — | 10 | 10 | 10 |
| Clay | 100 | 75 | 125 | 100 | 50 | 100 | 100 | 75 | 75 |
| Trimethylolpropane Trimethacrylate | 2 | 2 | 3.3 | — | 2 | 2 | 2 | 2 | 2 |
| Peroxide(5) | 7 | 7 | 11.6 | 3.5(6) | 7 | 7 | 7 | 7 | 7 |
| m-phenylene Dimaleimide | — | — | — | 1 | — | — | — | — | — |

Test Data
Conditions
300°F., 4000

Volume Swell(%)

Table I.-continued

Effect of Liquid Polybutadiene Content on Resistance of Cured Composition to Oil and Water Swell

| Ingredients(1) | 1 | 2 | 3 | 4 | 5 | 6 | 7 | 8 | 9 |
|---|---|---|---|---|---|---|---|---|---|
| psi, 7 days: | | | | | | | | | |
| White Oil | 176.3 | | 44 | 32.1 | 25.1 | | | 44 | 20.5 |
| Water | 51.6 | | 6.7 | 3.6 | 5.9 | | | 10.6 | 9.3 |
| 350°F., 4000 psi 7 days | | | | | | | | | |
| White Oil | | 110.5 | | | | 51.9 | 43.7 | 46 | |
| Water | | 6.2 | | | | 4.2 | 2.0 | 1.9 | |
| Observations | | | | Rigid Breaks on 90° Bend | | | | | |

Notes:
(1)All ingredients given in parts by weight.
(2)Unless indicated otherwise, EPDM was B. F. Goodrich Co. EPCAR 587, compounded by Goodrich with the indicated amount of napthenic oil (Goodrich designation EPCAR 5875).
(3)Napthenic oil, see note 1
(4)EPCAR 585
(5)VulCup 40 KE from Hercules Chemical Co., except example 4
(6)Dicumyl peroxide It will be apparent from a comparison of the test data in Table I that cured compositions exhibiting low volume swell at 350°F. and 4,000 psi both in oil and in water result where the liquid polybutadiene content of the blend is above 20% by weight. Blends containing significantly less than 20% by weight of the liquid polybutadiene, Examples 1 and 2, are extremely sensitive (in the cured form) to attack by oil even at temperatures below 300°F. To the other extreme, blends with high levels of the liquid polybutadiene, as in Example 9, although exhibiting excellent oil and water resistance, are too rigid for many primary insulation material applications. At extending oil levels of 0% (Example 4) and 25% (Example 5), the compositions exhibit quite acceptable oil and water resistance, however, omitting the oil entirely results in a composition too rigid for use in wire insulation applications.

Dielectric breakdown values were determined on cured compositions prepared from the formulation of Example 8 before and after environmental tests. The dielectric strength of the cured composition was greater than 350 volts per mil (no breakdown occurred), unchanged after 9 days under 1,000 psi pressure at 275°F. in white oil, and also unchanged after 7 days under 1,000 psi pressure at 275°F. in brine. Under the more extreme exposure of 7 days under 5,000 psi pressure at 275°F. a sample in white oil exhibited dielectric breakdown at 100 v/mil, while a sample exposed to water exhibited dielectric breakdown at 165 v/mil. These data demonstrate that useful dielectric strength of these materials is retained even on exposure to extreme conditions.

The data in Table II provide a good basis for further determining that the compositions of the instant invention are outstanding in their resistance to attack by oil and water under extreme environmental conditions. The commercial compositions tested are widely employed as conventional wire insulation in oil well cable construction. All exhibit unacceptably high volume change at the milder condition of 300°F. At 350°F., one EPDM composition exhibits acceptable resistance to water swell, but an unacceptably large degree of swell in oil.

Table II.

Swell Test Data for Commercial Insulation Materials

| | Example Number | | | |
|---|---|---|---|---|
| | 10 | 11 | 12 | 13 |

Table II.-continued

Swell Test Data for Commercial Insulation Materials

| Materials:(1) | EPDM | EPR | PP | X-linked PE |
|---|---|---|---|---|
| Test Condition | | Volume Swell, % | | |
| 300°F., 4000 psi 7 days | | | | |
| White Oil | 88 | 175 | distorted | 195 |
| Water | 5.4 | | distorted | 12.8 |
| 350°F., 4000 psi 7 days | | | | |
| White Oil | 99 | | disintegrated | |
| Water | 4 | | disintegrated | |

Notes: (1)EPDM, EPR are commercial cable insulation materials; PP is Borg-Warner proprietary polypropylene cable wire insulation; X-linked PE is crosslinked polyethylene commercial wire insulation.

As is well known, insulating materials are normally compounded with fillers, silica, clays, antioxidants, lubricants and the like to impart desired mechanical properties to the finished insulation. The compounded materials of the Table III were prepared, cured and tested to demonstrate the effect of changes in the filler and curing system over those shown in Table I on resistance to extreme environments. As is apparent from the test data reported in Table III, substitutions may result in less-than-optimum properties, nonetheless such compositions exhibit better environmental resistance than virtually all the commercial compounds tested.

Table III.

Formulations Illustrating Variations in Filler and Processing Aids

| Ingredients(1) | Example | |
|---|---|---|
| | 14 | 15 |
| EPDM(2) | 56 | 65 |
| Oil(3) | 56 | 65 |
| Liquid Polybutadiene | 44 | 35 |
| % Liquid Polybutadiene | 28.6% | 21.2% |
| Zinc Oxide | — | 5 |
| Stearic Acid | — | 1 |
| Dihydroquinoline | 2.2 | 1 |
| Clay | — | 100 |
| m-phenylene di-maleimide | 1.1 | 1 |
| Dibasic Lead Phosphite | 11.1 | — |
| Lead Phthalate | 11.1 | — |
| Carbon Black | 5.5 | — |
| Silicone Coupling Agent(4) | 5.5 | — |
| Peroxide | 11.1(5) | 3.5(6) |
| Silica | 56.0 | — |
| Test Data | Volume Swell (%) | |

Table III.-continued

Formulations Illustrating Variations
in Filler and Processing Aids

| Ingredients(1) | Example 14 | 15 |
|---|---|---|
| Conditions | | |
| 300°F., 4000 psi | | |
| 7 days | | |
| White Oil | 43.4 | 93.6 |
| Water | 17.4 | 35.5 |
| 350°F., 4000 psi | | |
| 7 days | | |
| White Oil | 48.0 | 71.7 |
| Water | 16.2 | 6.7 |

Notes:(1) All ingredients given in parts by weight
(2) Unless indicated otherwise, EPDM was B. F. Goodrich Co. EPCAR 587, compounded by Goodrich with the indicated amount of naphthenic oil (Goodrich designation EPCAR 5875).
(3) Napthenic oil, see note 1
(4) Silicone B 8994 from Ware Chemical Co.
(5) Dicumyl peroxide on clay
(6) Dicumyl peroxide It would be expected that some optimizing of additive types and levels will be necessary in order to give properties suited for particular applications and a somewhat lesser degree of resistance to extreme environmental exposures may be acceptable in particular cases. The selection of particular compounded materials for particular applications utilizing as the base materials the EPDM — liquid polybutadiene — oil blends of this invention is well within the skill of those familiar with the rubber compounding art and such applications are well within the contemplated scope of the instant invention.

The foregoing examples have been provided by way of illustration, thereby demonstrating electrical insulating materials resistant to destruction by exposure to oil, water and brine under high pressure at elevated temperature, and methods for the preparation thereof. It will be understood by those skilled in the art that variations and modifications can be effected without departing from the spirit and scope of the invention.

We claim:

1. A curable electrical insulation composition exhibiting improved oil and water resistance when cured comprising
   a. about 60 to 80 percent by weight of a blend consisting of an ethylene, propylene non-conjugated diene terpolymer having an ethylene/propylene ratio in the range 20/80 to 80/20 and from 2 to about 20% by weight of the terpolymer of non-conjugated diene and a hydrocarbon oil, in a ratio of from about 2:3 to about 3:1 respectively,
   b. about 40 to 20 percent by weight of a polybutadiene having greater than 50% 1,2-polymerized units and having a molecular weight between 1,500 and 25,000 g/mole,
   c. as a curing agent, about 2 to 6% by weight of a peroxide compound selected from the group dicumyl peroxide and $\alpha,\alpha'$-bis(t-butylperoxy)-di-isopropyl benzene, and
   d. as a curing co-agent, about 1 to 3% by weight of a compound selected from the group m-phenylene dimaleimide and trimethylolpropane trimethylacrylate.

2. The composition of claim 1 wherein the ratio of said ethylene, propylene non-conjugated diene terpolymer to hydrocarbon oil is substantially 1:1.

* * * * *